(12) United States Patent
Yamamoto et al.

(10) Patent No.: US 10,909,908 B2
(45) Date of Patent: Feb. 2, 2021

(54) IMAGE DISPLAY DEVICE

(71) Applicant: PANASONIC AVC NETWORKS KUALA LUMPUR MALAYSIA SDN. BHD., Selangor Darul Ehsan (MY)

(72) Inventors: Masahiro Yamamoto, Osaka (JP); Naoki Noguchi, Osaka (JP); Osamu Nakazawa, Osaka (JP); Toshiharu Tsutsui, Osaka (JP); Naoki Matsumura, Nara (JP); Kazuhiro Tada, Hokkaido (JP)

(73) Assignee: PANASONIC AVC NETWORKS KUALA LUMPUR MALAYSIA SDN. BHD., Shah Alam (MY)

( * ) Notice: Subject to any disclaimer, the term of this patent is extended or adjusted under 35 U.S.C. 154(b) by 26 days.

(21) Appl. No.: 16/083,363

(22) PCT Filed: Mar. 8, 2017

(86) PCT No.: PCT/JP2017/009331
§ 371 (c)(1),
(2) Date: Sep. 7, 2018

(87) PCT Pub. No.: WO2017/155000
PCT Pub. Date: Sep. 14, 2017

(65) Prior Publication Data
US 2019/0103051 A1 Apr. 4, 2019

(30) Foreign Application Priority Data
Mar. 8, 2016 (JP) .................................. 2016-044994

(51) Int. Cl.
*G09G 3/32* (2016.01)
*G02B 6/00* (2006.01)
(Continued)

(52) U.S. Cl.
CPC ............... *G09G 3/32* (2013.01); *F16M 11/22* (2013.01); *F21V 33/0052* (2013.01);
(Continued)

(58) Field of Classification Search
CPC ............. G09G 3/32; G09G 2300/0426; G09G 2310/08; G09G 2300/026;
(Continued)

(56) References Cited

U.S. PATENT DOCUMENTS 5,997,148 A * 12/1999 Ohkawa ............... G02B 6/0016
362/619
2002/0063816 A1* 5/2002 Nakamura ........ G02F 1/133308
349/65
(Continued)

FOREIGN PATENT DOCUMENTS

EP       2 775 333 A1    9/2014
JP     2000-276940 A    10/2000
(Continued)

OTHER PUBLICATIONS

International Search Report and Written Opinion dated May 30, 2017 in International Patent Application No. PCT/JP2017/009331; with partial English translation.
(Continued)

*Primary Examiner* — Olga V Merkoulova
(74) *Attorney, Agent, or Firm* — McDermott Will and Emery LLP

(57) ABSTRACT

An image display device includes: a display unit that displays an image; a right side support and a left side support that support the display unit in an upright state, and are at least partially light-transmissive; a right side first light source and a left side first light source that are disposed in the display unit, and emit light to at least a part of the right side support and the left side support.

9 Claims, 13 Drawing Sheets

(51) Int. Cl.
*H04N 5/64* (2006.01)
*G09F 9/00* (2006.01)
*F16M 11/22* (2006.01)
*F21V 8/00* (2006.01)
*F21V 33/00* (2006.01)
*H05B 45/20* (2020.01)
*G02B 5/02* (2006.01)
*H04N 21/422* (2011.01)
*H04N 5/58* (2006.01)

(52) U.S. Cl.
CPC ............. *G02B 5/0205* (2013.01); *G02B 6/00* (2013.01); *G02B 6/0025* (2013.01); *G02B 6/0096* (2013.01); *G09F 9/00* (2013.01); *H04N 5/64* (2013.01); *H05B 45/20* (2020.01); *F16M 2200/08* (2013.01); *H04N 5/58* (2013.01); *H04N 21/42202* (2013.01)

(58) Field of Classification Search
CPC ........... G09G 2310/027; G09G 3/3266; G09G 2320/0626; G09G 2300/0408; G09G 2310/0264; G09G 2310/0297; G09G 2320/064
See application file for complete search history.

(56) References Cited

U.S. PATENT DOCUMENTS

| 2005/0052586 | A1* | 3/2005 | Ogino | F21V 33/0052 349/58 |
| 2006/0209527 | A1* | 9/2006 | Shin | F21V 33/0052 362/23.18 |
| 2009/0167192 | A1* | 7/2009 | Diederiks | H04N 9/73 315/149 |
| 2010/0091193 | A1* | 4/2010 | Hoogenstraaten | G02B 6/001 348/578 |
| 2010/0103345 | A1* | 4/2010 | Kuo | G02B 6/0035 349/61 |
| 2010/0225629 | A1* | 9/2010 | Wang | H05K 9/0064 345/207 |
| 2010/0289666 | A1 | 11/2010 | Hardacker et al. | |
| 2011/0242456 | A1 | 10/2011 | Hioki et al. | |
| 2012/0257137 | A1* | 10/2012 | Nitanai | G02F 1/133615 349/58 |
| 2015/0029752 | A1* | 1/2015 | Lee | G02B 6/0016 362/610 |

FOREIGN PATENT DOCUMENTS

| JP | 2002-132378 A | 5/2002 |
| JP | 2005-012616 A | 1/2005 |
| JP | 2006-259667 A | 9/2006 |
| JP | 2011-215420 A | 10/2011 |

OTHER PUBLICATIONS

Extended European Search Report dated Jan. 17, 2019 for the corresponding European Patent Application No. 17763340.1.

* cited by examiner

IMAGE DISPLAY DEVICE

CROSS-REFERENCE OF RELATED APPLICATIONS

This application is the U.S. National Phase under 35 U.S.C. § 371 of International Patent Application No. PCT/JP2017/009331, filed on Mar. 8, 2017, which in turn claims the benefit of Japanese Application No. 2016-044994, filed on Mar. 8, 2016, the entire disclosures of which Applications are incorporated by reference herein.

TECHNICAL FIELD

The present disclosure relates to image display devices that display an image, and particularly relates to an image display device capable of emitting light from a periphery of a display unit.

BACKGROUND ART

Conventional image display devices that illuminate the surrounding area of the display unit with light generated from the display unit (display panel) are known. (See, for example, Patent Literature (PTL) 1.)

CITATION LIST

Patent Literature

[PTL 1] Japanese Unexamined Patent Application Publication No. 2006-259667.

SUMMARY OF THE INVENTION

Technical Problem

However, although conventional image display devices illuminate the surrounding area with light generated from the display unit, it is difficult to make the light emitted by the display unit blend in with the surrounding area. There is currently a demand for environments in which image display devices blend in with the surrounding area.

The present disclosure has been conceived to solve such a problem, and provides an image display device that creates an impression of a floating display unit.

Solution to Problem

In order to solve the aforementioned problem, an image display device according to an aspect of the present invention includes: a display unit that displays an image; at least one support that supports the display unit in an upright state, the support being at least partially light-transmissive; and at least one first light source that is provided in the display unit, and emits light to at least a part of the support.

Advantageous Effects of Invention

The present invention enables an image display device to create an impression of a floating display unit.

DESCRIPTION OF EMBODIMENTS

Figure 1:
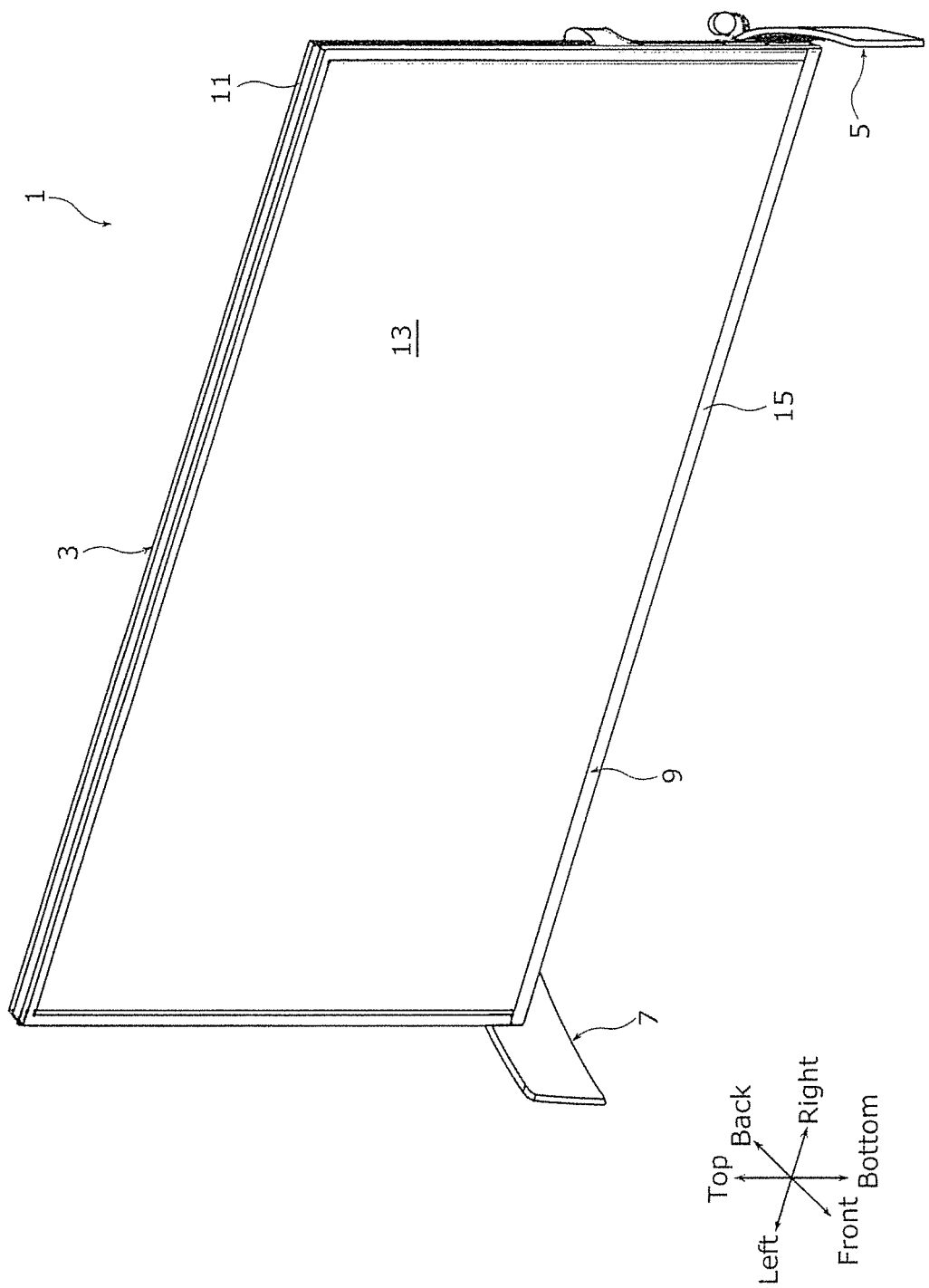
FIG. 1 is a perspective view of an image display device according to Embodiment 1.

Hereinafter, embodiments will be described in detail with reference to the drawings. However, unnecessarily detailed description may be omitted. For example, detailed descriptions of well-known matters or descriptions of components that are substantially the same as components described previous thereto may be omitted. This is to avoid unnecessary redundancy and facilitate understanding of the descriptions for those skilled in the art.

Note that the accompanying drawings and subsequent description are provided by the inventors to facilitate sufficient understanding of the present disclosure by those skilled in the art, and are thus not intended to limit the scope of the subject matter recited in the claims.

Also note that each drawing is not necessarily depicted accurately. Moreover, in each drawing, components that are substantially the same as components described previous thereto have the same reference numerals and overlapping descriptions may be omitted or simplified.

Embodiment 1

(Configuration)

The configuration of an image display device 1 according to Embodiment 1 will be described.

FIG. 1 is a perspective view of the image display device 1 according to Embodiment 1.

FIG. 1 shows the front-back, left-right, and top-bottom directions, specifying the placement side of the image display device 1 on the bottom and the side opposite of the placement side on the top. All of the directions indicated in FIG. 2 and onwards correspond with those in FIG. 1. Note that in FIG. 1, the top-bottom, left-right, and front-back directions are not limited to the foregoing since they are subject to change depending on the usage state. The same applies to all drawings hereafter.

As illustrated in FIG. 1, the image display device 1 is, for example, a flat panel display liquid crystal television receiver. The image display device 1 includes a display unit 3, a right side support 5 (an example of a support), and a left side support 7 (an example of a support).

The display unit 3 includes a panel body 9 and a rear cabinet 11, and is on the whole shaped like a rectangular flat panel.

The panel body 9 includes a display panel 13 and a front cabinet 15. The display panel 13 is on the inner side of the front cabinet 15. The display panel 13 that displays an image is provided on the front surface of the panel body 9.

The front cabinet 15 includes a rectangular frame and covers the outer periphery of a display screen of the panel body 9. The rear cabinet 11 covers the entire back surface of the panel body 9 and is coupled with the front cabinet 15. With this, the display screen of a liquid crystal panel is arranged on the front side of the display unit 3.

Figure 2:
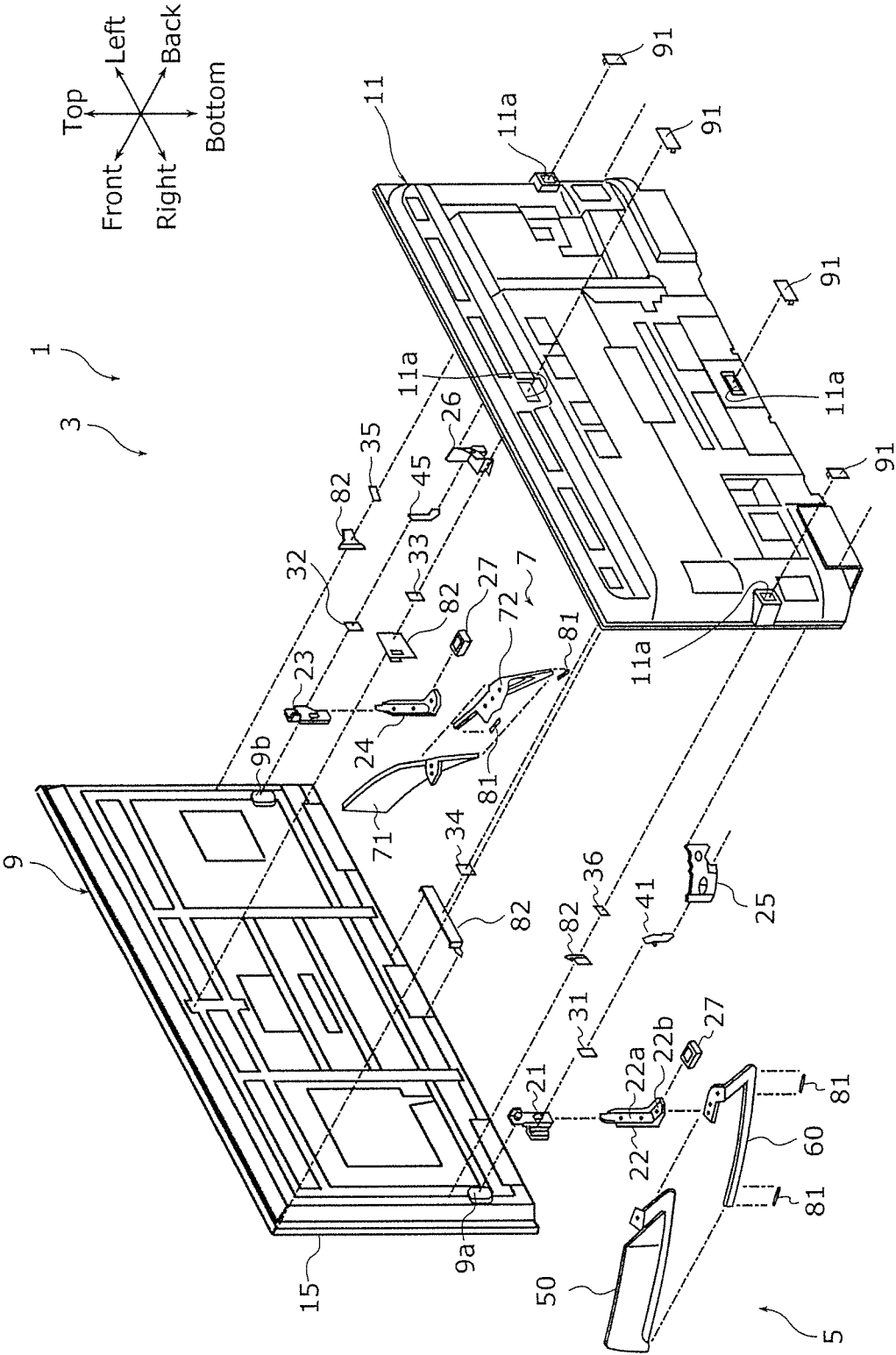
FIG. 2 is an exploded perspective view of the image display device according to Embodiment 1.
Figure 3:
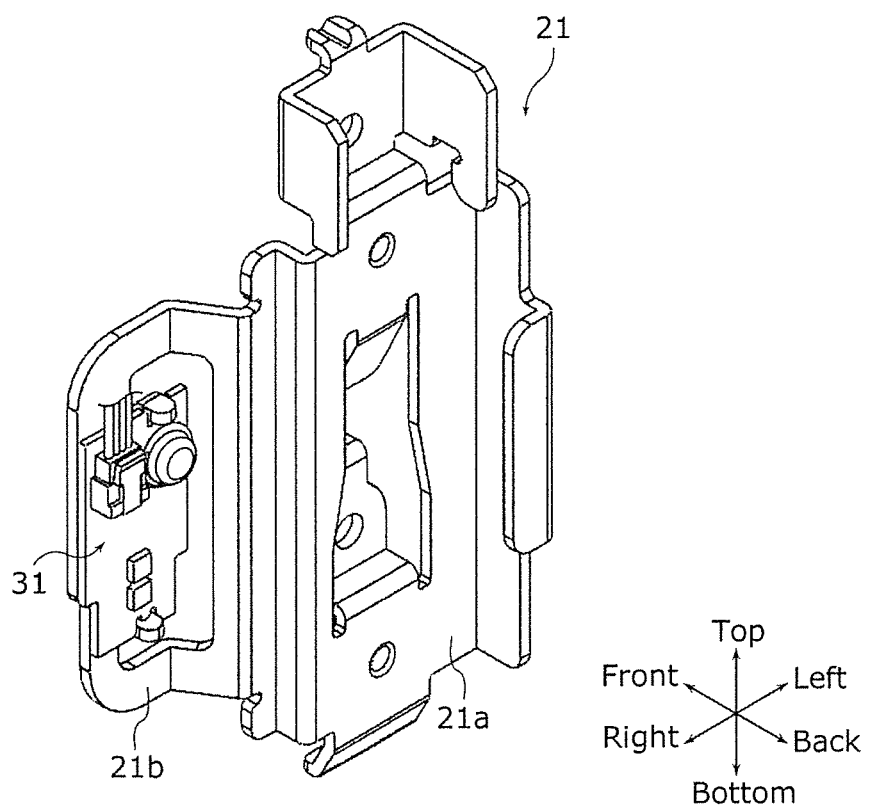
FIG. 3 is a perspective view of a first right side connecting fitting and a right side first light source of the image display device according to Embodiment 1.

FIG. 2 is an exploded perspective view of the image display device 1 according to Embodiment 1. FIG. 3 is a perspective view of a first right side connecting fitting 21 and a right side first light source 31 of the image display device 1 according to Embodiment 1.

As illustrated in FIG. 2, the first right side connecting fitting 21, a second right side connecting fitting 22, a first left side connecting fitting 23, a second left side connecting fitting 24, a right edge cover 25, and a left edge cover 26 are attached to the back surface of the panel body 9.

As illustrated in FIG. 3, the first right side connecting fitting 21 is screwed onto a right side fitting 9a in FIG. 2 on the bottom right side of the panel body 9. The first right side connecting fitting 21 includes a flat plate section 21a extending vertically, and a plate-shaped holding unit 21b on the right side of the flat plate section 21a. The flat plate section 21a includes two threaded holes lined up vertically for anchoring the second right side connecting fitting 22. The flat plate section 21a includes a connecting plate extending frontward and is attached to the panel body 9 with screws extending through the connecting plate. The holding unit 21b holds the right side first light source 31 (an example of a first light source) such that the first side light source 31 emits light backward.

As illustrated in FIG. 2, the first left side connecting fitting 23 is screwed onto a left side fitting 9b on the left bottom side of the panel body 9. The first left side connecting fitting 23 also includes a flat plate section extending vertically and a holding unit on the left side of the flat plate section. The flat plate section includes two threaded holes lined up vertically for anchoring the second left side connecting fitting 24. The flat plate section includes a connecting plate extending frontward and is attached to the panel body 9 with screws extending through the connecting plate. The holding unit holds the left side first light source 32 (an example of a first light source) such that it emits light backward.

The right side first light source 31 and the left side first light source 32 are electrically connected to a controller 10a which will be described later. The right side first light source 31 and the left side first light source 32 are SMD (Surface Mount Device) LED elements. An SMD LED element is, to be specific, a packaged LED element with an LED chip (light-emitting element) mounted in a resin-molded cavity including a resin with fluorescent substance.

Note that the right side first light source 31 and the left side first light source 32 are not limited to such a configuration, and that a COB (Chip-on-Board) light-emitting module with an LED chip mounted directly on the circuit board (not illustrated in the drawings) of the right side first light source 31 may also be used. Moreover, the light-emitting elements of the right side first light source 31 and the left side first light source 32 are not limited to LED, but may also be, for example, semiconductor light-emitting elements such as a semiconductor laser, or other solid light-emitting elements such as an organic EL (electroluminescent), an inorganic EL or another EL material.

A right side light guide 41 is provided on the back side of the right side first light source 31 (direction of emitted light). A left side light guide 45 is provided on the back side of the left side first light source 32 (direction of emitted light). The right side light guide 41 and the left side light guide 45 are transparent optical components that transmit light. The right side light guide 41 and the left side light guide 45 are made of light-transmissive resin such as polycarbonate or acryl, but the right side light guide 41 and the left side light guide 45 may be made from any other sort of material.

Figure 4:
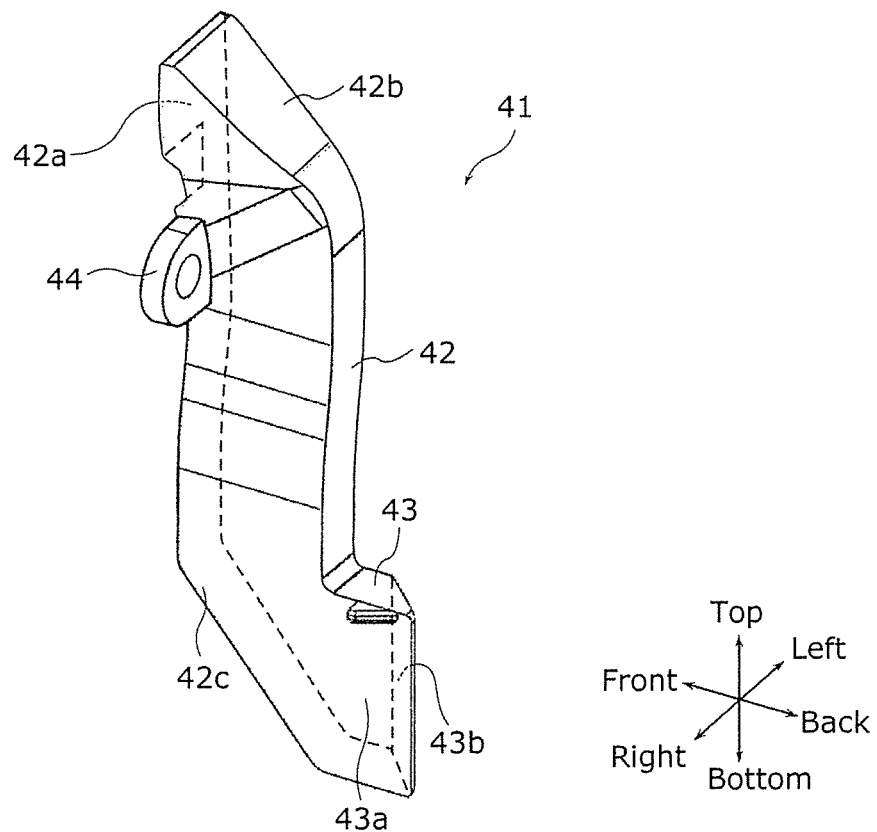
FIG. 4 is a perspective view of a right side light guide of the image display device according to Embodiment 1.

FIG. 4 is a perspective view of the right side light guide 41 of the image display device 1 according to Embodiment 1.

As illustrated in FIG. 4, the right side light guide 41 has a pillar-shaped structure extending vertically. The right side light guide 41 includes an extension section 42 and an insertion section 43.

The extension section 42 includes an incidence surface 42a that receives incoming light from the right side first light source 31, a first reflection surface 42b, and a second reflection surface 42c. The incidence surface 42a is pointed frontward and is situated on the top side of the right side light guide 41. The incidence surface 42a is preferably substantially perpendicular to the light of the right side first light source 31 emitted backward. The first reflection surface 42b is provided on the back side of the incidence surface 42a. The first reflection surface 42b is inclined downward from front to back such that the extension surfaces of the incidence surface 42a and the first reflection surface 42b intersect. The second reflection surface 42c is provided on the bottom side of the extension section 42 and is substantially parallel with the first reflection surface 42b.

Moreover, a screw stop 44 is included on the right side of the incidence surface 42a on the extension section 42. The right side light guide 41 is affixed onto the right edge cover 25 with a screw extending through the screw stop 44.

The insertion section 43 protrudes backward from the bottom edge of the extension section 42. The insertion section 43 is inserted into the right edge cover 25 which will be described later. The distal end of the insertion section 43 includes an emission surface 43a that transmits and emits the light from the incidence surface 42a, and a third reflection surface 43b. The emission surface 43a is on the bottom side of the right side light guide 41 and is in contact with the right side support 5.

The right edge cover 25 is attached to the bottom right corner of the rear cabinet 11. Similarly, the left edge cover 26 is attached to the bottom left corner of the rear cabinet 11.

Figure 5:
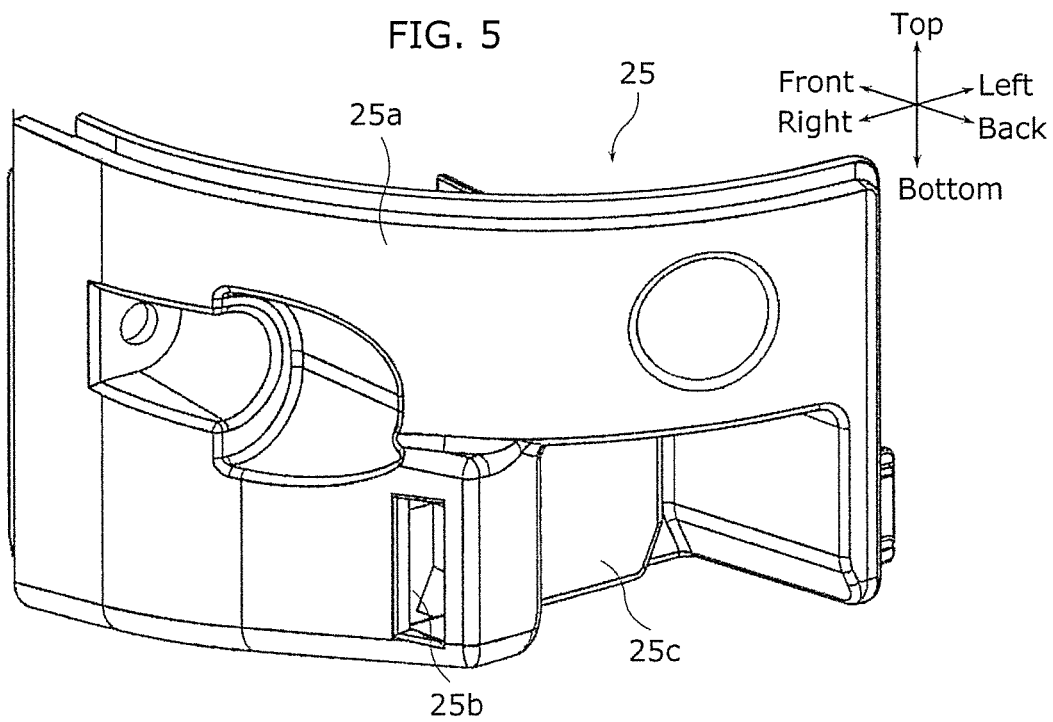
FIG. 5 is a perspective view of a right edge cover of the image display device according to Embodiment 1.

FIG. 5 is a perspective view of the right edge cover 25 of the image display device 1 according to Embodiment 1.

As illustrated in FIG. 5, the right edge cover 25 includes a fan-shaped plate section and a lateral wall 25a.

The lateral wall 25a is a curved wall extending upward from the arc-shaped border of the plate section. A through-hole 25b in which the insertion section 43 of the right side light guide 41 is inserted, and an accommodation space 25c which recedes from back to front, are provided in the lateral wall 25a.

The through-hole 25b is a hole in which the insertion section 43 of the right side light guide 41 can be inserted. When the insertion section 43 is inserted into the through-hole 25b from the front to the back of the lateral wall 25a, the emission surface 43a of the right side light guide 41 is exposed to the lateral wall 25a. The emission surface 43a is in contact with the right side support 5. The accommodation space 25c accommodates a part of the right side support 5 and a part of a cover component 27.

As illustrated in FIG. 2, the second right side connecting fitting 22 is a joint that connects the right side support 5 and the first right side connecting fitting 21 to each other. The second right side connecting fitting 22 forms an L-shape when seen from the right side.

The second right side connecting fitting 22 includes a flat plate-shaped first affixing section 22a that engages with the flat plate section 21a of the first right side connecting fitting 21, and a second affixing section 22b extending backward from the bottom edge of the first affixing section 22a. The first affixing section 22a is inserted from the bottom side of the flat plate section 21a on the first right side connecting fitting 21. The first affixing section 22a is screwed onto the flat plate section 21a of the first right side connecting fitting 21. The second affixing section 22b is affixed to the right side support 5. The resin cover component 27 covering the second affixing section 22b that is screwed fast is provided on the top of the second affixing section 22b.

As illustrated in FIG. 1, the right side support 5 holds the right side of the display unit 3 in an upright state. The left side support 7 holds the left side of the display unit 3 in an upright state.

As illustrated in FIG. 2, the right side support 5 includes a right side light-transmissive component 50 (an example of a light-transmissive component) that transmits light, and a right side body 60 (an example of a body) that is made of metal and engages with the right side light-transmissive component 50.

Figure 6:
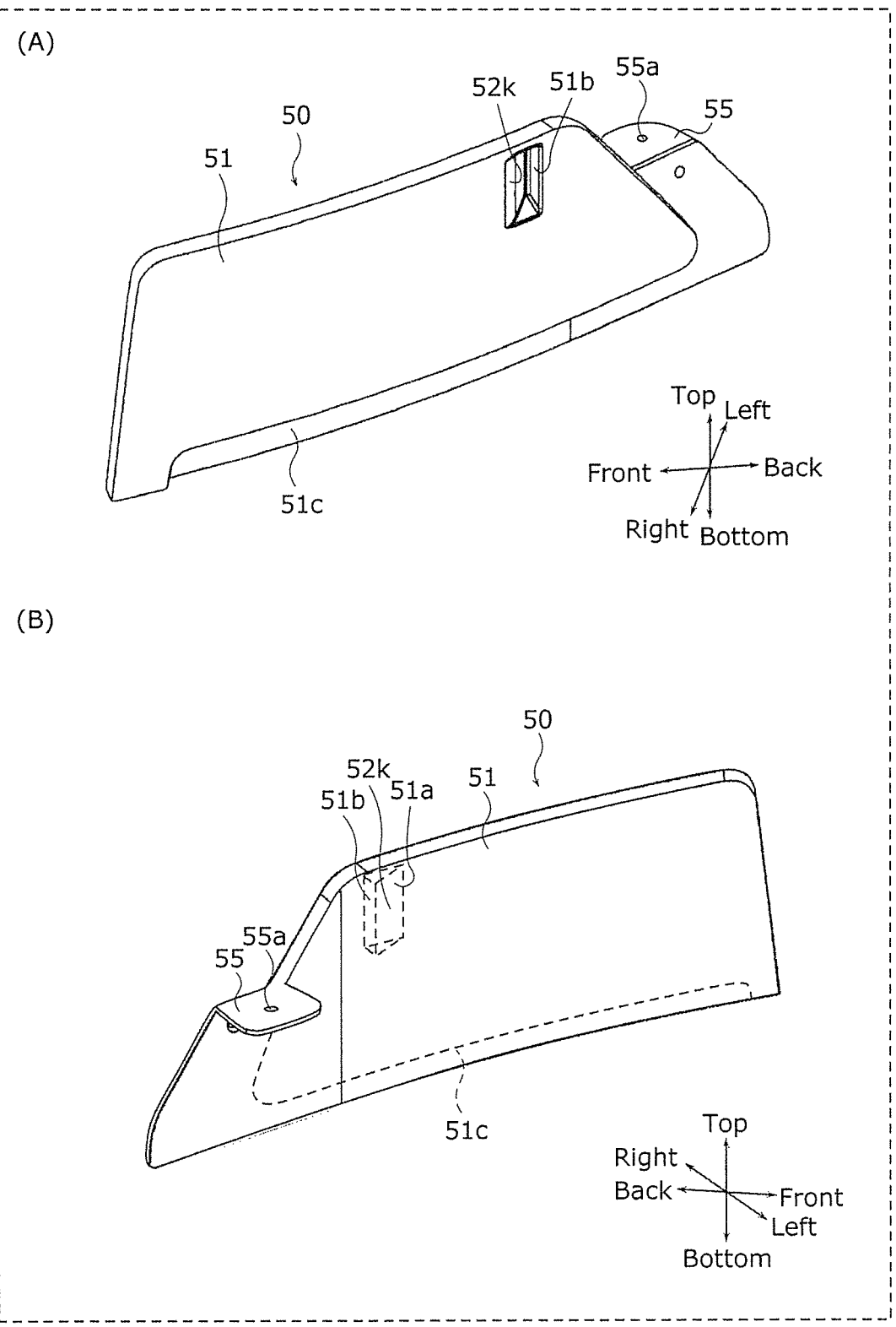
FIG. 6 is a diagram in which (A) is a perspective view seen from the right side of the light-transmissive component of the image display device according to Embodiment 1, and (B) is a perspective view seen from the left side of the light-transmissive component of the image display device according to Embodiment 1.
Figure 7:
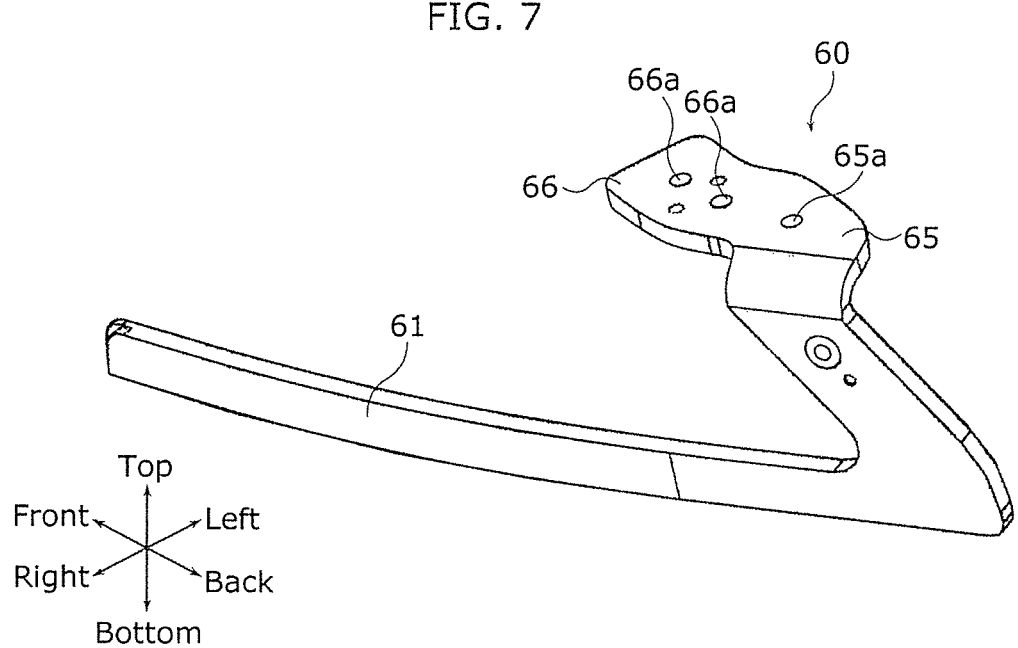
FIG. 7 is a perspective view of a body of the image display device according to Embodiment 1.
Figure 8:
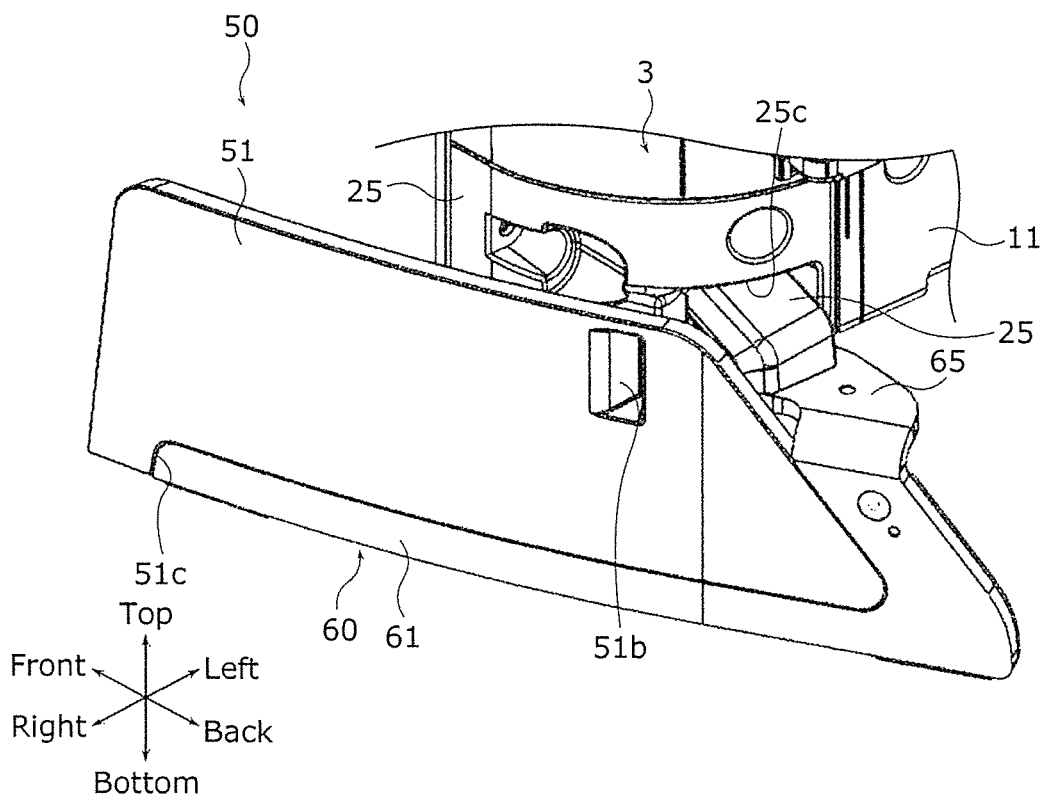
FIG. 8 is a perspective view of a right side support of the image display device according to Embodiment 1.

(A) of FIG. 6 is a perspective view seen from the right side of the right side light-transmissive component 50 of the image display device 1 according to Embodiment 1. (B) of FIG. 6 is a perspective view seen from the left side of the right side light-transmissive component 50 of the image display device 1 according to Embodiment 1. FIG. 7 is a perspective view of the right side body 60 of the image display device 1 according to Embodiment 1. FIG. 8 is a perspective view of the right side support 5 of the image display device 1 according to Embodiment 1. FIG. 8 shows the right side support 5 attached to the bottom right side of the display unit 3 and holding the display unit 3 in the upright state. Note that the left side support 7 attached to the bottom left side of the display unit 3 and holding the display unit 3 in the upright state is not illustrated.

As illustrated in (A) of FIG. 6, (B) of FIG. 6, and FIG. 8, the right side light-transmissive component 50 includes a plate section 51 and a light-transmissive support plate 55.

The plate section 51 forms a curved, elongated plate shape that is warped sideways to the left as seen from the front. The surrounding border of the plate section 51 has been etched to diffuse the emitted light. The plate section 51 is made of light-transmissive resin such as polycarbonate or acryl, but may also be made from any other sort of material.

The plate section 51 includes a contact surface 51a, a recess 51b, and a foot side engagement section 51c.

The contact surface 51a is on the left side surface (the surface of the display unit 3) and is in contact with the emission surface 43a of the right side light guide 41. The contact surface 51a receives the light transmitted from the right side light guide 41. There is preferably no gap between the contact surface 51a and the emission surface 43a. The recess 51b becomes narrower from the surface on the opposite side of the contact surface 51a (right side surface) toward the contact surface 51a, and recedes perpendicular to the plate section 51 and extends vertically. The recess 51b includes an inclined surface 52k. The inclined surface 52k is the lateral surface of the recess 51b, and the extension surfaces of the inclined surface 52k and of the emission surface 43a intersect. The foot side engagement section 51c has a receding shape from the surface on the opposite side (right side surface) of the contact surface 51a such that the foot side engagement section 51c can fit the right side body 60. The foot side engagement section 51c is substantially L-shaped along the bottom part of the bottom edge and the back part of the back edge of the plate section 51.

The light-transmissive support plate 55 is on the back side of the plate section 51 and is folded perpendicularly to the left side. The light-transmissive support plate 55 includes a threaded hole 55a and is affixed with a screw extending through the threaded hole 55a and the right side body 60.

As illustrated in FIG. 7 and FIG. 8, the right side body 60 includes an engagement section 61, a first body support plate 65, and a second body support plate 66.

The engagement section 61 is a plate forming substantially an L-shape when seen from the right. The engagement section 61 is fit into the foot side engagement section 51c of the right side light-transmissive component 50 along the bottom part and the back part of the plate section 51 on the right side light-transmissive component 50. Anti-slide components 81 in FIG. 2, which are made of rubber and the like, are provided on the bottom edge surface of the engagement section 61.

The first body support plate 65 is on the top side of the engagement section 61 and is folded perpendicularly to the left side. The first body support plate 65 is provided between the cover component 27 and the light-transmissive support plate 55 of the right side light-transmissive component 50. The first body support plate 65 includes a threaded hole 65a, and the light-transmissive support plate 55 of the right side light-transmissive component 50 is affixed with a screw extending through the threaded hole 65a. In other words, the rear surface of the right side body 60 is arranged such that the foot side engagement section 51c on right side light-transmissive component 50 and the first body support plate 65 adhere closely to each other. The second body support plate 66 is coplanar with the first body support plate 65 and extends frontward from the first body support plate 65.

The second body support plate 66 includes threaded holes 66a, is disposed on the rear surface of the second affixing section 22b of the second right side connecting fitting 22, and is screwed onto the second affixing section 22b. When the right side support 5 is assembled to the display unit 3, the second body support plate 66 is accommodated inside the accommodation space 25c of the right edge cover 25 such that the second body support plate 66 cannot be seen from the outside.

Note that the left side light guide 45, the left edge cover 26, the second left side connecting fitting 24, a left side light-transmissive component 71 (an example of a light-transmissive component) of the left side support 7, and a left side body 72 (an example of a body) of the left side support 7 constitute a top-to-bottom and front-to-back symmetrical configuration with the right side light guide 41, the right edge cover 25, the second right side connecting fitting 22, the right side light-transmissive component 50 of the right side support 5, and the right side body 60 of the right side support 5, and as such, description thereof is omitted.

As illustrated in FIG. 2, a top side second light source 33 (an example of a second light source), a bottom side second light source 34 (an example of a second light source), a left side second light source 35 (an example of a second light source), and a right side second light source 36 (an example of a second light source) are provided on the back surface of the panel body 9.

The top side second light source 33 is provided around the center of the top part on the back surface of the panel body 9. The bottom side second light source 34 is provided around the center of the bottom part on the back surface of the panel body 9. The right side second light source 36 is provided around the center of the right part on the back surface of the panel body 9. The left side second light source 35 is provided around the center of the left part on the back surface of the panel body 9.

Figure 9:
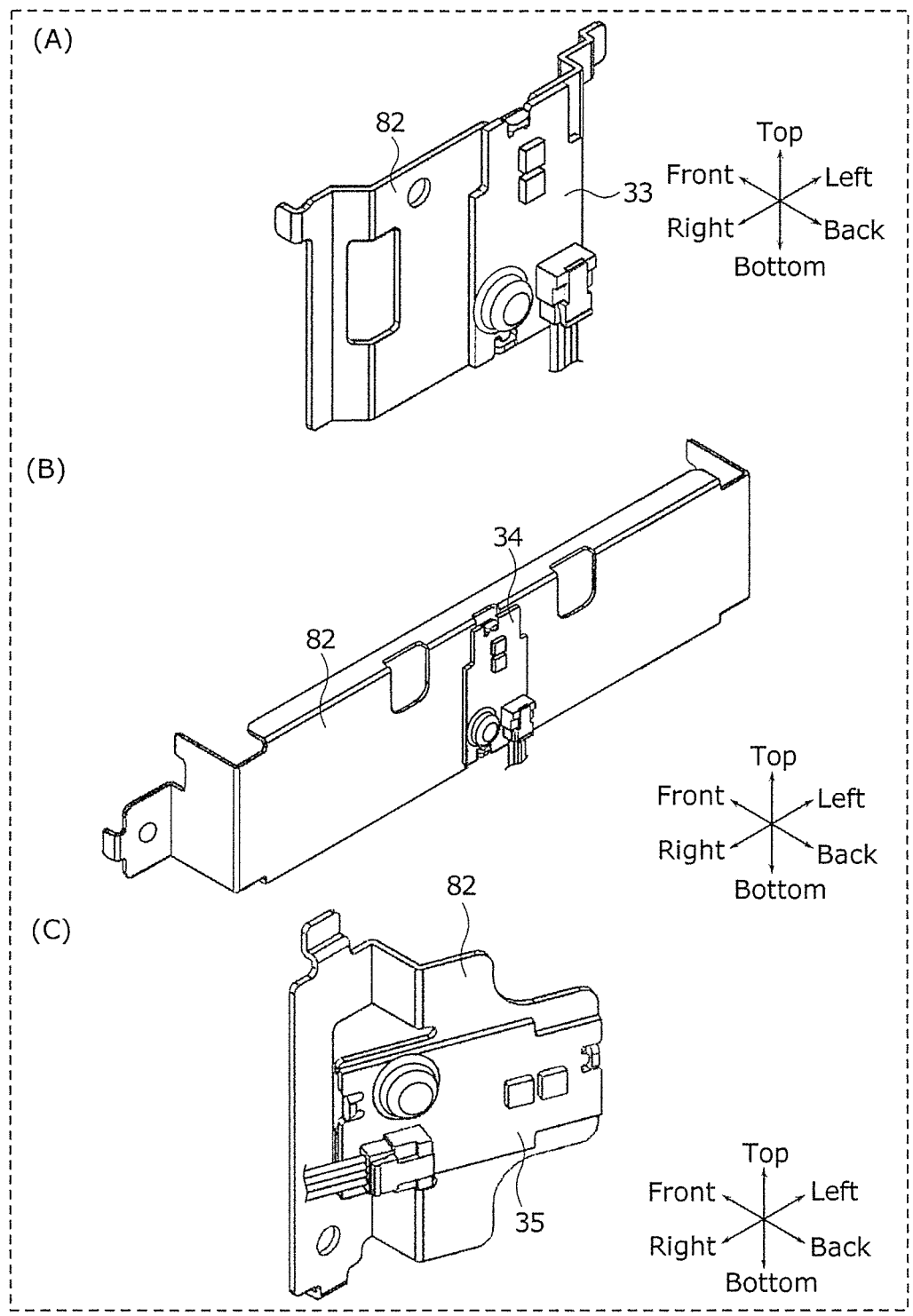
FIG. 9 is a diagram in which (A) is a perspective view of a fitting and a top side second light source of the image display device according to Embodiment 1, (B) is a perspective view of a fitting and a bottom side second light source of the image display device according to Embodiment 1, and (C) is a perspective view of a fitting and a left side second light source of the image display device according to Embodiment 1.

(A) of FIG. 9 is a perspective view of fittings 82 and the top side second light source 33 of the image display device 1 according to Embodiment 1. (B) of FIG. 9 is a perspective view of the fittings 82 and the bottom side second light source 34 of the image display device 1 according to Embodiment 1. (C) of FIG. 9 is a perspective view of the fittings 82 and the left side second light source 35 of the image display device 1 according to Embodiment 1.

As illustrated in (A) of FIG. 9, (B) of FIG. 9 and (C) of FIG. 9, the top side second light source 33, the bottom side second light source 34, the left side second light source 35, and the right side second light source 36 in FIG. 2 are attached to the back surface of each the fittings 82 such that the top side second light source 33, the bottom side second light source 34, the left side second light source 35, and the right side second light source 36 emit light backward. The top side second light source 33, the bottom side second light source 34, the left side second light source 35, and the right side second light source 36 in FIG. 2 are the same optical elements as the right side first light source 31 and the left side first light source 32. The components each of which mounts the top side second light source 33, the bottom side second light source 34, the left side second light source 35, and the right side second light source 36 in FIG. 2 to a corresponding one of the fittings 82 are respectively attached to the top side rear surface, the lower side rear surface, the right side rear surface, and the left side rear surface of the display unit 3.

As illustrated in FIG. 2, on the back surface of the fitting 82 to which the bottom side second light source 34 is attached, a control circuit that makes the display panel 13 light up is provided on the back surface of the panel body 9. The control circuit is covered by the fitting 82 to which the bottom side second light source 34 is attached. Note that the right side second light source 36 constitutes a top-to-bottom and front-to-back symmetrical configuration with the left side second light source 35, and as such, description thereof is omitted.

The rear cabinet 11 is a flat plate-shaped resin cover. Through-holes 11a, 11a, 11a and 11a which correspond with the locations of the top side second light source 33, the bottom side second light source 34, the left side second light source 35, and the right side second light source 36, are provided on the rear cabinet 11. The through-holes 11a are holes pierced back to front. The opening of each through-hole 11a is covered by a corresponding one of diffuser panels 91.

Figure 10:
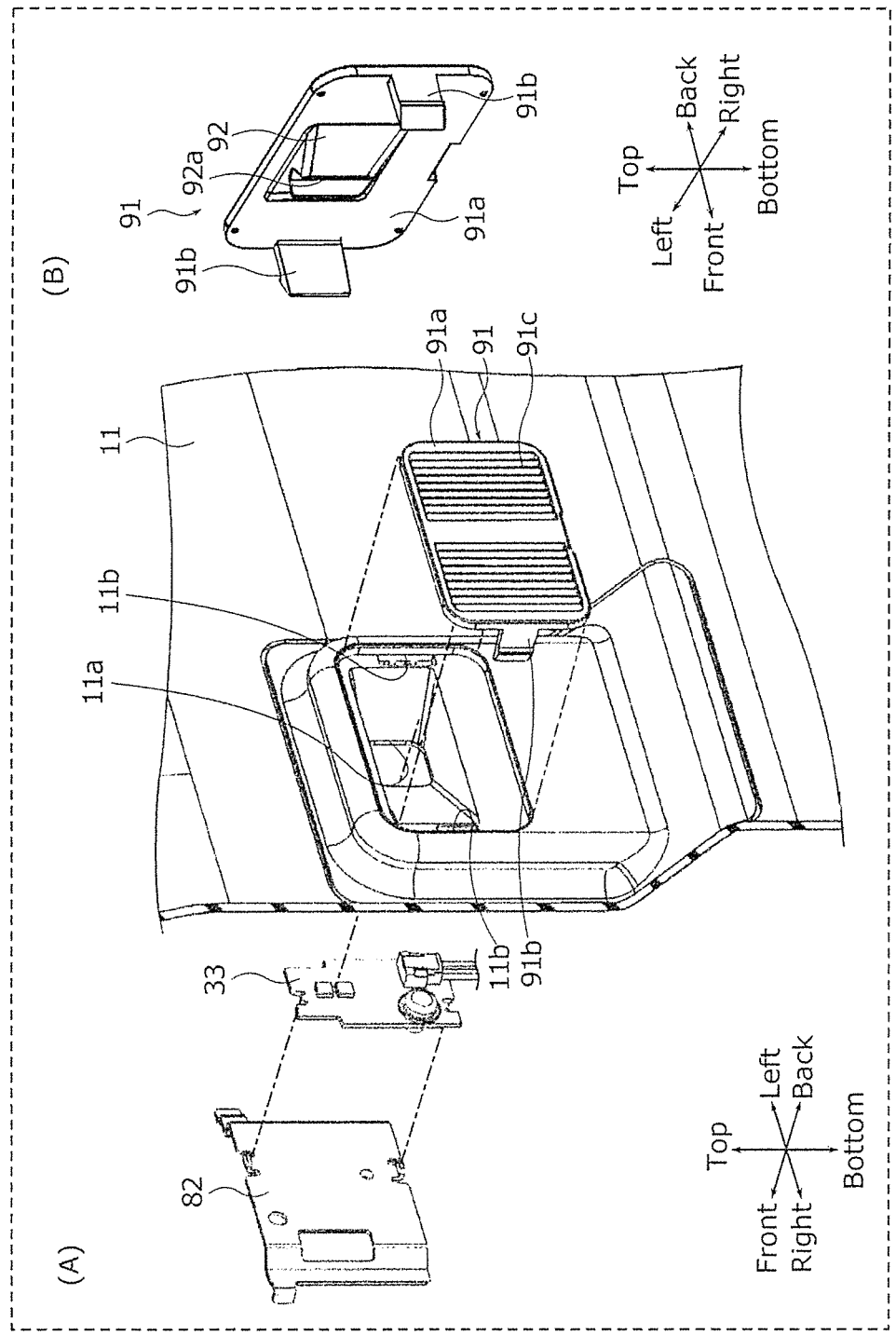
FIG. 10 is a diagram in which (A) is a partial exploded cross-sectional perspective view of the top part of a rear cabinet of the image display device according to Embodiment 1, and (B) is a perspective view of a diffuser panel of the image display device according to Embodiment 1.

(A) of FIG. 10 is a partial exploded cross-sectional perspective view of the top part of the rear cabinet 11 of the image display device 1 according to Embodiment 1. (B) of FIG. 10 is a perspective view of the diffuser panel 91 of the image display device 1 according to Embodiment 1.

As illustrated in (A) of FIG. 10, the through-hole 11a guides the light emitted by the top side second light source 33 to the diffuser panel 91 of the through-hole 11a.

To be specific, the through-hole 11a tapers from back to front. In other words, the through-hole 11a becomes narrower from the diffuser panel 91 toward the top side second light source 33. Note that when looking at the through-hole 11a from the back, the through-hole 11a preferably becomes narrower from back to front such that the circuit boards of the top side second light source 33 cannot be seen.

As illustrated in (B) of FIG. 10, the opening on the back side of the through-hole 11a in the top part of the rear cabinet 11 is mounted with the removable diffuser panel 91. The diffuser panel 91 is required to be a light-transmissive component. Moreover, diffusing particles may, for example, also be internally provided in the diffuser panel 91.

The diffuser panel 91 includes a flat plate section 91a and one pair of hooks 91b on both edges of the flat plate section 91a that protrude forward. The flat plate section 91a includes an incidence protrusion 92 protruding from back to front. The incidence protrusion 92 extends vertically and is cone-shaped. The distal end of the incidence protrusion 92 includes a notched groove 92a extending vertically and receding backward. The light emitted from the top side second light source 33 enters through the notched groove 92a. Both of the hooks 91b are inserted into engagement holes 11b in FIG. 10B on the rear cabinet 11 which affix the diffuser panel 91 on the rear cabinet 11.

Note that the through-holes 11a, 11a, and 11a corresponding with the bottom side second light source 34, the left side second light source 35, and the right side second light source 36 and the diffuser panels 91, 91, and 91 constitute the same configuration as the through-hole 11a corresponding with the top side second light source 33 and the diffuser panel 91, and as such, description thereof is omitted.

Figure 11:
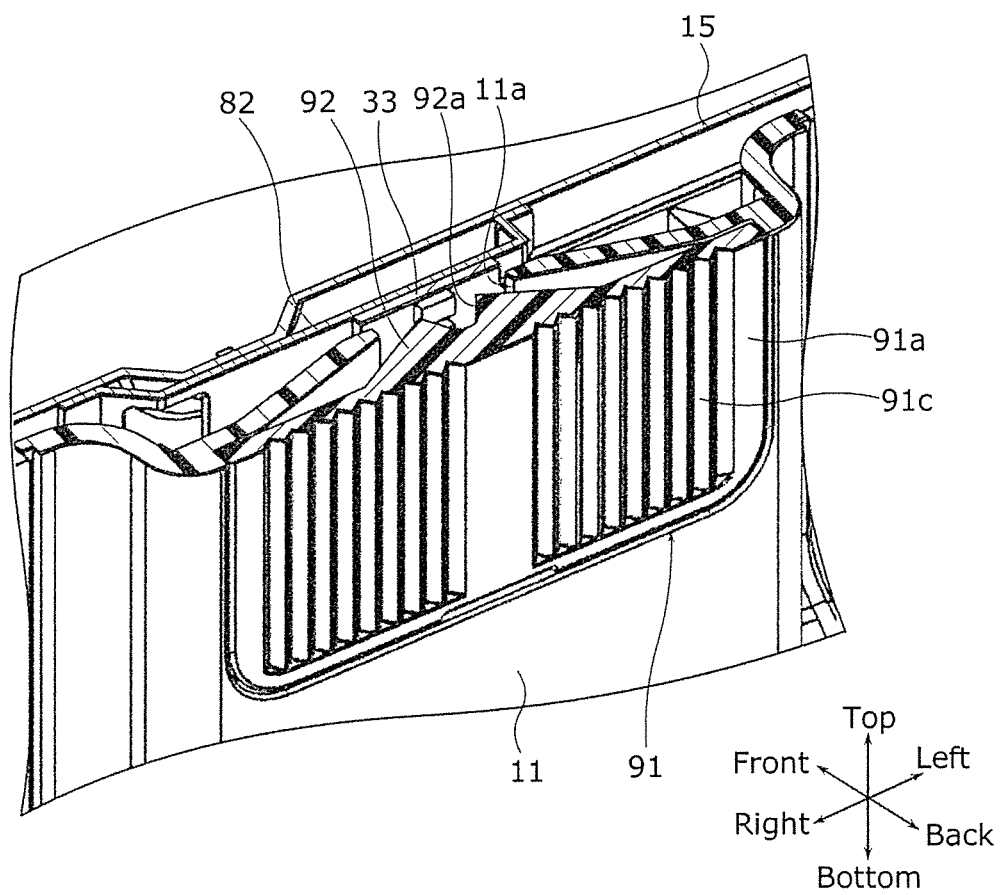
FIG. 11 is a partial enlarged cross-sectional perspective view of the rear cabinet of the image display device according to Embodiment 1.

FIG. 11 is a partial enlarged cross-sectional perspective view of the rear cabinet 11 of the image display device 1 according to Embodiment 1. FIG. 11 shows the rear cabinet 11 mounted on the panel body 9 and the diffuser panel 91 mounted on the rear cabinet 11.

As illustrated in FIG. 11, the diffuser panel 91 can emit the light emitted from the top side second light source 33 outward.

The diffuser panel 91 includes a plurality of diffusion grooves 91c that emit light outward. The diffusion grooves 91c are disposed on the back surface of the diffuser panel 91, and form a corrugated surface that emits the light from the top side second light source 33 along the left and right directions of the rear side of the display unit 3. To be specific, the diffuser panel 91 corresponding with the location of the top side second light source 33 (top part) includes a plurality of vertically extending diffusion grooves 91c. The diffusion grooves 91c form a pattern of repeating triangular ridges and furrows. The light emitted from the top side second light source 33 passes through the through-hole 11a and enters from the front surface of the diffuser panel 91. The transmitted light inside the diffuser panel 91 is then emitted and diffused from the diffuser panel 91.

Moreover, the diffuser panel 91 corresponding with the location of the bottom side second light source 34 (bottom part) includes a plurality of vertically extending diffusion grooves 91c similarly to the diffuser panel 91 corresponding with the location of the top side second light source 33 (top part). The diffuser panel 91 corresponding with the location of the bottom side second light source 34 (bottom part) emits the light from the bottom side second light source 34 along the left and right directions of the rear side of the display unit 3.

The diffuser panel 91 corresponding with the location of the left side second light source 35 (left part) and the diffuser panel 91 corresponding with the location of the right side second light source 36 (right side) includes a plurality of diffusion grooves extending to the left and right. The diffuser panel 91 corresponding with the location of the left side second light source 35 (left part) and the diffuser panel 91 corresponding with the location of the right side second light source 36 (right part) emit and diffuse the light from the left side second light source 35 and the right side second light source 36 along the top and bottom directions of the rear side of the display unit 3.

Figure 12:
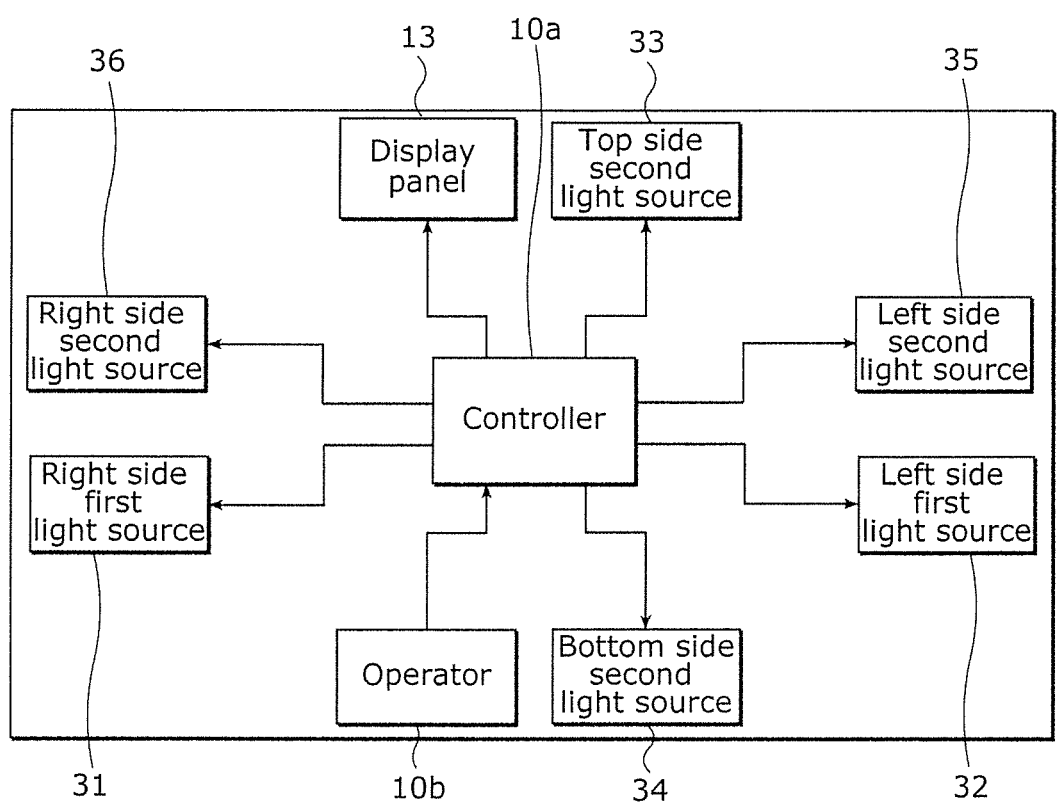
FIG. 12 is a block diagram of the image display device according to Embodiment 1.

FIG. 12 is a block diagram of the image display device 1 according to Embodiment 1.

As illustrated in FIG. 12, the panel body 9 includes, besides the display panel 13, the controller 10a and an operator 10b.

The controller 10a controls the display panel 13, a backlight, and the like based on an image signal obtained externally via a communication unit not illustrated in the drawing. The controller 10a includes, for example, a memory unit (not illustrated in the drawing) for storing a control program, and an arithmetic processor for executing the control program. Note that the image signal is the signal for displaying an image on the display panel 13, and is output from recording media such as DVD (Digital Versatile Disc) or broadcasting devices such as digital terrestrial television or digital satellite television.

The controller 10a is electrically connected to the right side first light source 31, the left side first light source 32, the top side second light source 33, the bottom side second light source 34, the left side second light source 35, and the right side second light source 36. The controller 10a outputs a control signal to the right side first light source 31, the left side first light source 32, the top side second light source 33, the bottom side second light source 34, the left side second light source 35, and the right side second light source 36, and switches a color of the light emitted by thereof between daylight and incandescent. The controller 10a includes a circuit board and a switch unit including a variety of electronic components mounted on the circuit board. The color temperature of daylight color ranges from 6020 K to 7050 K and the color temperature of incandescent color ranges from 2580 K to 2870 K. Note that the switch unit may also be a switch for allowing the user to switch the color of the light of each of the right side first light source 31, the left side first light source 32, the top side second light source 33, the bottom side second light source 34, the left side second light source 35, and the right side second light source 36 between daylight and incandescent.

Moreover, from the point of view of blending in with the surrounding area, the color of the light of the right side first light source 31, the left side first light source 32, the top side second light source 33, the bottom side second light source 34, the left side second light source 35 and the right side second light source 36 is preferably all daylight or incandescent.

The controller 10a turns on all of the first light sources simultaneously (the right side first light source 31 and the left side first light source 32), and turns on all of the second light sources simultaneously (the top side second light source 33, the bottom side second light source 34, the left side second light source 35 and the right side second light source 36). Note that the controller 10a turns on each first light source and each second light source independently from each other, and may also be able to switch the color of the emitted light between daylight and incandescent, and turn the light off.

Figure 13:
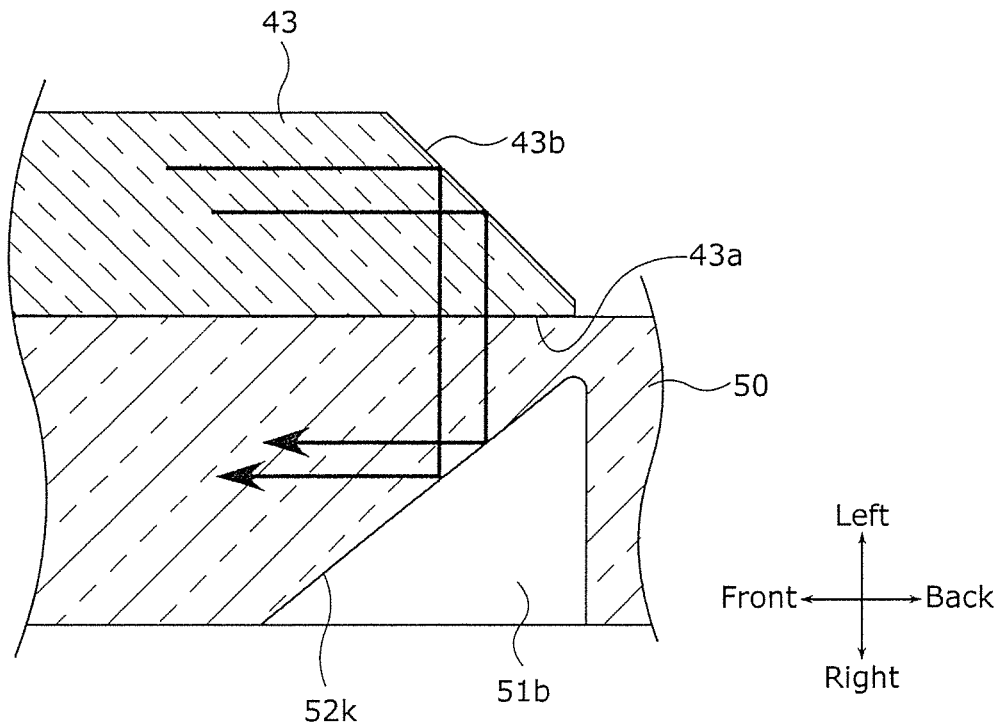
FIG. 13 is a schematic view of the right side light guide and the light transmitted through the light-transmissive component in the image display device according to Embodiment 1.

FIG. 13 is a schematic view of the right side light guide 41 and the light transmitted through the right side light-transmissive component 50 on the image display device 1 according to Embodiment 1.

As illustrated in FIG. 4, in the image display device 1, the light emitted from the right side first light source 31 is received on the incidence surface 42a of the right side light guide 41. The light received on and transmitted through the incidence surface 42a is reflected by the first reflection surface 42b of the right side light guide 41, the second reflection surface 42c of the right side light guide 41, and the third reflection surface 43b in FIG. 13, and is emitted from the emission surface 43a of the insertion section 43. As illustrated in FIG. 13, the light emitted from the emission surface 43a is received on the contact surface 51a of the right side light-transmissive component 50. The majority of the light received on the contact surface 51a of the right side light-transmissive component 50 is reflected by the inclined surface 52k of the recess 51b, and is transmitted to the front side of the right side light-transmissive component 50. The transmitted light is thus emitted from the entirety of the right side light-transmissive component 50. Note that how the light emitted from the left side first light source 32 also applies to the right side, and as such, description thereof is omitted.

Moreover, in this image display device 1, the light emitted from the top side second light source 33 passes through the through-hole 11a and the majority of the light is received on the incidence protrusion 92 of the diffuser panel 91. The light received on the incidence protrusion 92 of the diffuser panel 91 passes through the flat plate section, and is diffused along the left and right directions of the rear cabinet 11. Moreover, this also applies to the bottom part of the rear cabinet 11, but on the left and right parts of the rear cabinet 11, the light is diffused along the top and bottom directions.

Figure 14:
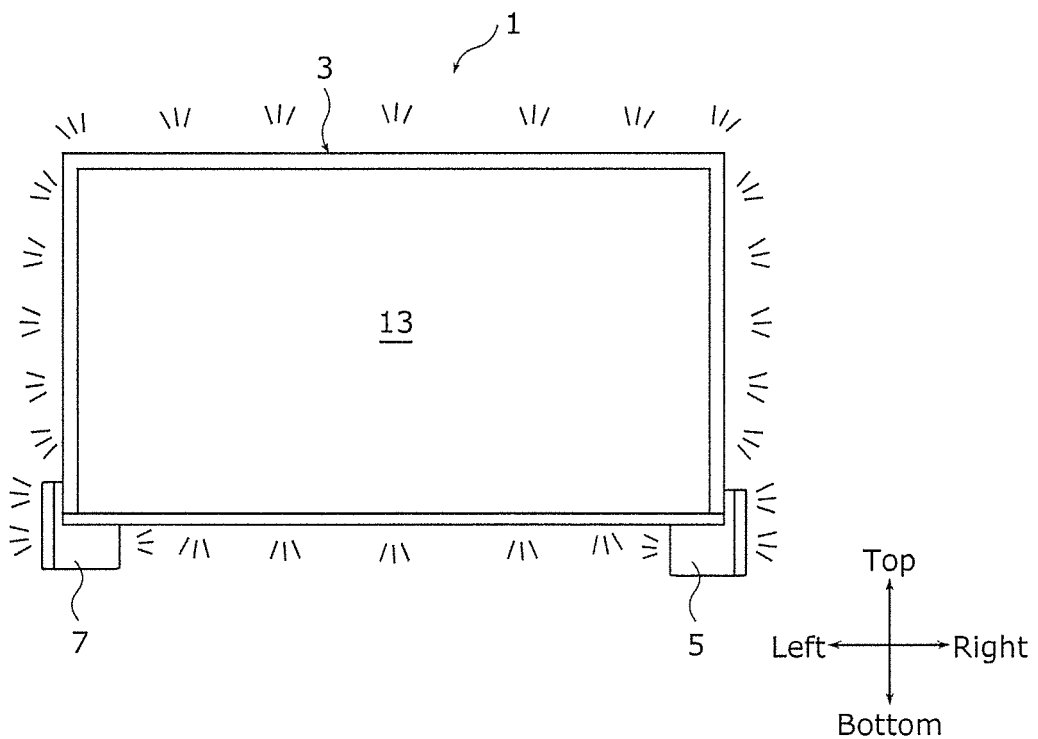
FIG. 14 is a schematic view of the right side first light source, left side first light source, top side second light source, bottom side second light source, left side second light source and the right side second light source in a turned-on state of the image display device according to Embodiment 1.

FIG. 14 is a schematic view of the right side first light source 31, the left side first light source 32, the top side second light source 33, the bottom side second light source 34, the left side second light source 35, and the right side second light source 36 in the turned-on state of the image display device 1 according to Embodiment 1.

As illustrated in FIG. 14, the bottom side of the image display device 1 is illuminated with the light emitted from each first light source. Moreover, in the image display device 1, the surrounding area of the display unit 3 is illuminated with the light from each second light source being emitted to all four sides of the back side of the display unit 3.

Advantageous Effects of Invention

Next, the advantageous effects of the image display device 1 according to Embodiment 1 will be described.

As described above, the image display device 1 according to Embodiment 1 includes: the display unit 3 that displays an image; is least partially light-transmissive, at least one support that supports the display unit 3 in an upright state, the support being at least partially light-transmissive, and at least one first light source that emits light to at least a part of the support.

In this configuration, the light emitted from the right side first light source 31 and the left side first light source 32 illuminates the lower side of the display unit 3 due to the light emitted from the right side light-transmissive component 50 and the left side light-transmissive component 71.

Therefore, the image display device 1 can create an impression of the floating display unit 3.

Moreover, in the image display device 1 according to Embodiment 1, the right side support 5 and the left side support 7 include the right side light-transmissive component 50 that is light-transmissive, and the right side body 60 that is made of metal and engages with the right side light-transmissive component 50.

In this configuration, it is possible to securely strengthen the right side support 5 by engaging the right side body 60 with the right side light-transmissive component 50. Moreover, the left side produces the same advantageous effect.

Moreover, the image display device 1 according to Embodiment 1 further includes the right side light guide 41 that transmits the light emitted by the right side first light source 31 to the right side light-transmissive component 50.

In this configuration, since it is possible to guide the light emitted by the right side first light source 31 via the right side light guide 41 to the right side light-transmissive component 50, the freedom of placement of the right side first light source 31 is enhanced. Note that the left side produces the same advantageous effects.

Moreover, the image display device 1 according to Embodiment 1 further includes: the top side second light source 33, the bottom side second light source 34, the left side second light source 35 and the right side second light source 36 along an outer periphery of the display unit 3; and a plurality of diffuser panels 91 that diffuse the light emitted from the corresponding top side second light source 33, the bottom side second light source 34, the left side second light source 35 and the right side second light source 36.

In this configuration, it is possible to blend in with the surrounding area in a living space by enveloping the outer periphery of the display unit 3 with the especially wide distribution of soft light emitted from the diffuser panels 91.

In particular, the usage state, in which a wall is situated near the back side of the image display device 1, enables the light emitted from the diffusion grooves 91c of each diffuser panel 91 to reflect off the wall and illuminate the surrounding area of the display unit 3 more brightly.

Moreover, the image display device 1 according to Embodiment 1 further includes a controller 10a that outputs a control signal to the right side first light source 31, the left side first light source 32, the top side second light source 33, the bottom side second light source 34, the left side second light source 35 and the right side second light source 36. The controller 10a switches the color of the light emitted by the right side first light source 31, the left side first light source 32, the top side second light source 33, the bottom side second light source 34, the left side second light source 35 and the right side second light source 36 between daylight and incandescent.

In this configuration, since the controller 10a can switch the color of the light emitted from the right side first light source 31, the left side first light source 32, the top side second light source 33, the bottom side second light source 34, the left side second light source 35, and the right side second light source 36 between daylight and incandescent, it becomes easier to blend in with the surrounding area in the living space.

Moreover, in the image display device 1 according to Embodiment 1, a plurality of through-holes 11a that guide the light emitted by each second light source to one of diffuser panels 91 is provided on the display unit 3. The through-holes 11a become narrower from each diffuser panel 91 toward each second light source.

In this configuration, each diffuser panel 91 can easily emit the light emitted from one of the second light sources.

In particular, since the internal structure of the image display device 1 becomes more difficult to see, the image display device 1 has an enhanced presentation.

Embodiment 2

Another configuration of the image display device 1 in Embodiment 2 is the same as the configuration of the image display device 1 in Embodiment 1, and components that are the same as components described previous thereto have the same reference numerals and overlapping descriptions are omitted.

Figure 15:
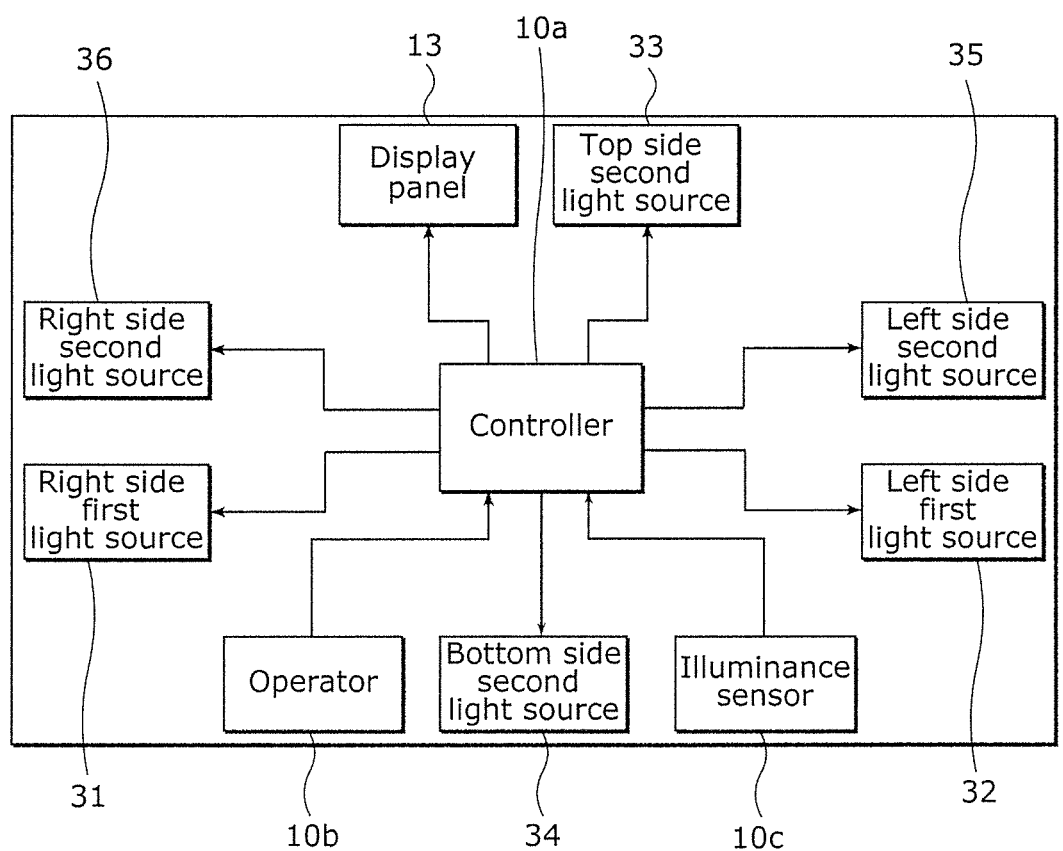
FIG. 15 is a block diagram of an image display device according to Embodiment 2.

FIG. 15 is a block diagram of the image display device 1 according to Embodiment 2.

As illustrated in FIG. 15, the panel body 9 includes, besides the display panel 13, the controller 10a, an illuminance sensor 10c (an example of a sensor unit), and the operator 10b.

The illuminance sensor 10c is connected to the controller 10a. The illuminance sensor 10c is a detection circuit that measures an illumination intensity (brightness) of the surrounding area and communicates with the controller 10a; and is provided to control light emission of the right side first light source 31, the left side first light source 32, the top side second light source 33, the bottom side second light source 34, the left side second light source 35, and the right side second light source 36. The illuminance sensor 10c is provided to gather light from the surrounding area of the front cabinet 15.

The controller 10a causes at least each first light source or each second light source to emit light when a threshold value of the illumination intensity detected by the illuminance sensor 10c is less than a predetermined value. In contrast, the controller 10a causes the right side first light source 31, the left side first light source 32, the top side second light source 33, the bottom side second light source 34, the left side second light source 35, and the right side second light source 36 to stop emitting light when the threshold value of the illumination intensity detected by the illuminance sensor 10c is greater than or equal to the predetermined value. The controller 10a causes the right side first light source 31, the left side first light source 32, the top side second light source 33, the bottom side second light source 34, the left side second light source 35, and the right side second light source 36 to turn on and off based on a preset threshold value stored in the memory unit. Note that the threshold value may be preset or set by the user.

The operator 10b accepts commands from the user as required. The operator 10b is, for example, a built-in operation panel in the image display device 1. Moreover, the operator 10b may also be a stand-alone remote control separate from the image display device 1.

[Operation]

The operation of the image display device 1 according to Embodiment 2 will be described with reference to FIG. 16.

Figure 16:
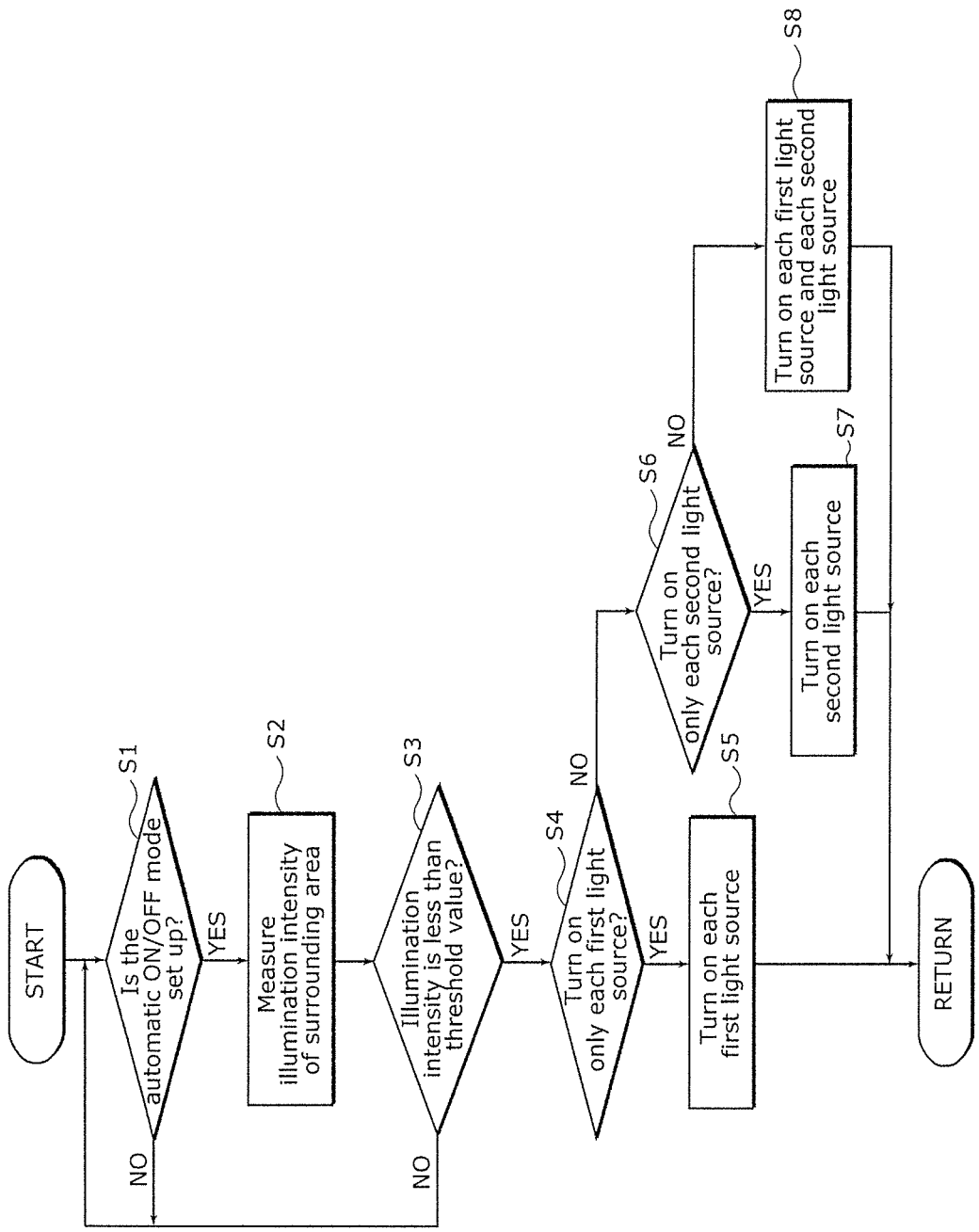
FIG. 16 is a flowchart illustrating operation of the image display device according to Embodiment 2.

FIG. 16 is a flowchart of the operation of the image display device 1 according to Embodiment 2.

As illustrated in FIG. 16, after booting up the image display device 1, the user first activates an automatic ON/OFF mode which automatically turns off each first light source and each second light source when the exterior of the image display device 1 is dark. The automatic ON/OFF mode is an operation mode that is installed in an input section of the image display device 1. Note that a remote control for operating the image display device 1 is preferably also provided with this automatic ON/OFF mode. The automatic ON/OFF mode is then launched following the settings of the user via the operator 10b.

The controller 10a determines whether the automatic ON/OFF mode is set up (S1). When the automatic ON/OFF mode is set up (YES in S1), the illuminance sensor 10c measures the illumination intensity of the surrounding area (S2). The illuminance sensor 10c then transmits an illuminance signal which shows the measured illumination intensity to the controller 10a. However, when the automatic ON/OFF mode is not set up (NO in S1), the controller 10a determines turning on each first light source and each second light source unnecessary, and the process flow returns to step S1.

The controller 10a determines from the illuminance signal whether the illumination intensity of the surrounding area is less than the threshold value (S3). When the threshold value of the illumination intensity is greater than or equal to the predetermined value (NO in S3), the controller 10a determines turning on each first light source and each second light source unnecessary since the surrounding area is bright, and the process flow returns to step S1.

When the threshold value of the illumination intensity is less than the predetermined value (YES in S3), the controller 10a determines turning on at least each first light source or each second light source necessary since the surrounding area is dark. The controller 10a determines whether to turn on at least each first light source or each second light source. The controller 10a first determines whether only each first light source is set up to be turned on (S4). When only each first light source is set up to be turned on (YES in S4), the controller 10a only turns on each first light source (S5). The process flow then returns to START.

When only each first light source is not set up to be turned on (NO in S4), the controller 10a determines whether only each second light source is set up to be turned on (S6). When only each second light source is set up to be turned on (YES in S6), the controller 10a only turns on each second light source (S7). The process flow then returns to START.

When only each second light source is not set up to be turned on (NO in S6), the controller 10a determines that both each first light source and each second light source are set up to be turned on, and turns on both each first light source and each second light source (S8). The process flow then returns to START.

For example, when the user has activated this automatic ON/OFF mode, the surrounding area of the image display device 1 is illuminated when the surrounding area is dark (the illumination intensity of the surrounding area is less than the threshold value); and when the user illuminates the room by turning on the light of the room and the like, the automatic ON/OFF mode turns off each first light source and each second light source.

Moreover, this image display device 1 can be set up such that the right side first light source 31 and the left side first light source 32 are not turned on depending on usage.

Moreover, when the image display device 1 is booted up, the user can also select a wall-mounted or placement option during initial setup of the image display device 1. When the user selects the wall-mounted option, the controller 10a determines that the right side support 5 and the left side support 7 are not attached, and sets up the right side first light source 31 and the left side first light source 32 to not emit light. In contrast, when the user selects the placement option, the controller 10a determines that the right side support 5 and the left side support 7 are attached, and sets up the right side first light source 31 and the left side first light source 32 to emit light.

Advantageous Effects of Invention

Next, the advantageous effects of the image display device 1 according to Embodiment 2 will be described.

The image display device 1 according to Embodiment 2 further includes the illuminance sensor 10c that detects the illumination intensity. The controller 10a further causes at least the first light source or the second light source to emit light when the threshold value of the illumination intensity detected by the illuminance sensor 10c is less than the predetermined value. Moreover, the controller 10a causes the first light source and the second light source to stop emitting light when the threshold value of the illumination intensity detected by the illuminance sensor 10c is greater than or equal to the predefined value.

In this configuration, even when the living space is dark, it is possible to light up the surrounding area of the image display device 1, since the controller 10a automatically turns on at least the first light source or the second light source via the illuminance sensor 10c. Accordingly, the performance of the light emitted is very effective.

Embodiment 2 produces the same other advantageous effects as Embodiment 1.

Other Variations

The above image display devices according to Embodiments 1 and 2 have been described based on Embodiments 1 and 2, but the present invention is not limited to the above Embodiments 1 and 2.

Moreover, in the above embodiments, the controller may also control the light emission depending on the brightness of the surrounding area through the automatic ON/OFF mode. To be specific, a first threshold value and a second threshold value that is greater than the first threshold value are stored in the memory unit. The controller may also turn on light with daylight color when the illumination intensity detected is less than the first threshold value, turn on incandescent color when the illumination intensity detected is greater than or equal to the first threshold value and less than the second threshold value, and turn off the light when the illumination intensity detected is greater than or equal to the second threshold value.

Moreover, in the above embodiments, a reflector that reflects light may be provided in a place other than the corresponding incidence surface and the corresponding emission surface of the right side light guide and the left side light guide. In this case, it is possible to emit stronger light from the emission surface.

Moreover, in the above embodiments, when the image display device is attached to a wall, the right side support and the left side support are detached. In such a case, the right side first light source and the left side first light source may be set up to not emit any light. For example, a setup may also be used in which (i) the switch provided on the fitting is turned ON, and the right side first light source and the left side first light source can be turned on when the right side support and the left side support are attached to the fitting of the display unit, and (ii) the switch is turned OFF, and the right side first light source and the left side first light source cannot be turned on when the right side support and the left side support are detached. Moreover, a light sensor and the like may be disposed in the display unit, and the controller may also determine whether to turn on the right side first light sources and the left side first light sources through a signal detected by the sensor.

The above embodiments have been described as examples of techniques according to the present disclosure. The accompanying drawings and the detailed description are provided for this purpose.

Therefore, the components described in the accompanying drawings and the detailed description include, in addition to components essential to overcoming problems, components that are not essential to overcoming problems but are included in order to exemplify the techniques described above. Thus, those non-essential components should not be deemed essential due to the mere fact that they are illustrated in the accompanying drawings and described in the detailed description.

The above embodiments are for providing examples of the techniques according to the present disclosure, and thus various modifications, substitutions, additions, and omissions are possible in the scope of the claims and equivalent scopes thereof.

INDUSTRIAL APPLICABILITY

The present invention is applicable to an image display device such as a television that displays an image.

The invention claimed is:

1. An image display device, comprising:
a display unit that displays an image;
a plurality of supports that support the display unit in an upright state, the plurality of supports being at least partially light-transmissive; and
at least one first light source that is disposed in the display unit, and emits light to at least a part of the plurality of supports, wherein:
the plurality of supports are disposed at different locations of a bottom side of the display unit and spaced apart from each other, and support the display unit in the upright state; and
each of the plurality of supports includes a light-transmissive component that is plate-shaped and light-transmissive, and
the light-transmissive component transmits the light emitted from the at least one first light source and supports the display unit in the upright state.

2. The image display device according to claim 1, wherein:
each of the plurality of supports includes a body that is made of metal and engages with the light-transmissive component, and
the body supports the display unit in the upright state together with the light-transmissive component.

3. The image display device according to claim 2, further comprising:
a light guide that transmits the light emitted by the at least one first light source to the light-transmissive component.

4. The image display device according to claim 1, further comprising:
a plurality of second light sources along an outer periphery of the display unit; and
a plurality of diffuser panels each of which diffuses light emitted by one of the plurality of second light sources.

5. The image display device according to claim 4, further comprising:
a controller that outputs a control signal to the at least one first light source and the plurality of second light sources, wherein
the controller switches a color of the light emitted by the at least one first light source and the plurality of second light sources between daylight and incandescent.

6. The image display device according to claim 5, further comprising:
a sensor unit that detects an illumination intensity, wherein
the controller further causes:
the at least one first light source or the plurality of second light sources, or the at least one first light source and the plurality of second light sources to emit light when the illumination intensity detected by the sensor unit is less than a predetermined threshold value; and
the at least one first light source and the plurality of second light sources to stop emitting light when the illumination intensity detected by the sensor unit is greater than or equal to the predetermined threshold value.

7. The image display device according to claim 4, wherein
the display unit includes a plurality of through-holes each of which guides the light emitted from one of the plurality of second light sources to one of the plurality of diffuser panels, and
the plurality of through-holes become narrower from the plurality of diffuser panels toward the plurality of second light sources.

8. The image display device according to claim 1, wherein
the light-transmissive component includes a plate section that is elongated and plate-shaped, and a light-transmissive support plate that is connected to the plate section and fixed to the display unit.

9. The image display device according to claim 1, further comprising:
a light guide that transmits the light emitted by the at least one first light source to the light-transmissive component, wherein
the light-transmissive component includes a recess that (i) is disposed at a position corresponding to the light guide and (ii) reflects the light transmitted through the light guide and incident on the light-transmissive component.

* * * * *